UNITED STATES PATENT OFFICE.

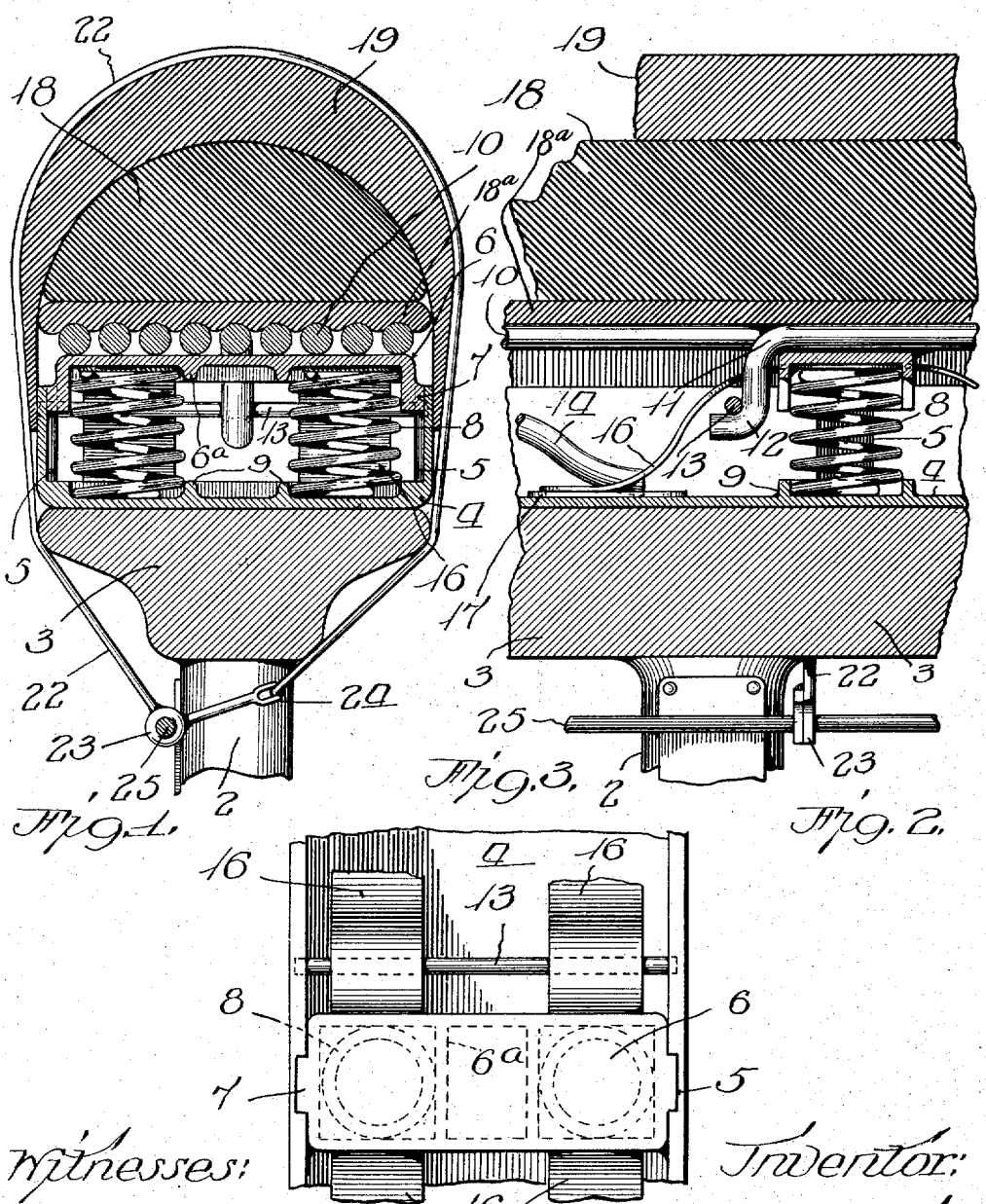

CHARLES F. FORSTER, OF OAK PARK, ILLINOIS.

VEHICLE-TIRE.

1,163,000.  Specification of Letters Patent.  Patented Dec. 7, 1915.

Application filed October 3, 1912. Serial No. 723,672.

*To all whom it may concern:*

Be it known that I, CHARLES F. FORSTER, a citizen of the United States, and a resident of the village of Oak Park, in the county of Cook and State of Illinois, have invented certain new and useful Improvements in Vehicle-Tires, of which the following is a specification.

My present invention relates to that class of vehicle tires which are resilient and has for its main object the provision of adequate elements and their arrangement and organization so as to provide a resilient tire and to suitably adapt such a tire to a wheel, and to firmly secure it to a wheel.

Other objects of my invention are the construction of the rim to receive the springs and the tire, the construction and arrangement of the springs and the cases therefor; the arrangement for securing the several spring cases to the wheel; the construction of the casing for covering the springs and its division into segments which may be separately removed and replaced; the manner of joining the respective segments of the casing and the arrangement for securing the divers casing segments in position upon the wheel.

It will be obvious that while the various features or elements comprise together a completely organized tire, some of the elements herein described may be utilized in other combinations, some of which are hereinafter suggested, and that such use would still come within the principle and spirit of my invention.

I attain my objects by the form and construction of the several parts and the arrangement and organization of such parts shown in the accompanying drawings, in which:—

Figure 1 is a transverse section through my assembled tire and spring-box, showing the rods for holding the spring box tops in position, the pad for covering the rods, and the tread, and also the means for securing the assembled tire to the felly of the wheel. Fig. 2 is a longitudinal section through the structure shown in Fig. 1, and Fig. 3 is a top plan of the spring box top in position, the other elements having been omitted for the purpose of more clearly illustrating the "top".

Similar reference characters refer to similar parts throughout the several views.

My invention may be embodied in any form of wheel, but a preferable form is the kind known as the artillery type, comprising a suitable hub, spokes 2, and felly 3.

In or on the felly 3, I provide an outwardly or peripherally opening channel 4 of rectangular cross section. Spaced at suitable distances, preferably in alinement with the spokes and cut in the inner faces of the sides of the channel 4, are opposite radially extending grooves or channels 5.

Rectangular members 6, hereinafter referred to as the spring box tops, are provided, which will fit into the channel 4, and upon the ends of which are lugs 7 adapted to enter the transverse radially extending grooves 5, in the channel 4, so as to locate the later referred to springs about the periphery of the wheel so that they cannot be displaced and at the same time permit the requisite amount of radial movement.

Under the spring box tops 6 are located helical springs 8 the upper ends of which are held in place by transverse ridge 6ª on the underside of the top 6. Transverse ridges 9 are provided in the bottom of the channel 4 to locate the inner ends of the springs 8 as shown. The spring box tops 6 are also provided with a pair of oppositely arranged longitudinal leaf springs 16, which pass through apertures in the flanges on the spring box top curve downwardly to the bottom of the channel 4 and are provided upon their lower ends with shoes 17, to contact the bottom of the channel 4 and take the frictional wear. These leaf springs are welded to the under side of the top 6.

After the several groups of springs 8, with their respective spring box tops 6, have been put in position they are secured in position by means of circumferentially disposed rods 10. These rods 10 are provided upon one end with the right angle bends 11 and 12, so that the end will extend under a cross rod 13 provided in the channel 4, closely adjacent to the location of the spring box top. The rod 10 is given a circular form in order to have it conform to and rest upon the several spring box tops, and the other end of the said rod 10 is curved downwardly to extend into the channel 4, as shown at 14 in Fig. 2.

The rods 10 are started, and necessarily stopped at different spring box tops so that all the other rods lap the termination of each rod respectively, thereby forming a substantially continuous means of holding the springs and spring box tops in position, and at the same time, as each rod terminates in something less than a complete circle, they thus afford an opportunity for each rod to move to accommodate itself to the movement of the springs 8 and 16, and the spring box tops 6.

Upon the rods 10 is provided a pad 18, the inner periphery of which, or that portion of 18ª which rests upon the rods 10, is made of a heavy coarse fabric, whereas the remaining portion of the pad may be made of fabric similar to the usual outer casing of a tire, or of any suitable material. This pad may be either continuous, butt-ended, or in segments, as it is firmly held in position by the elements yet to be described.

Over the top of the pad 18 is placed the outer casing 19, which may be made as the outer casings of tires are now made or of any suitable construction, but, however, the outer casing is more ample and extends down well over the sides of the channel 4.

For retaining the outer casing in place, I provide a means, preferably consisting of metallic bands or rods 22, having the alining eyes 23, joint 24, and circumferentially disposed rod 25, said rods 22 are adapted to surround the outer casing and the felly of the wheel and to secure them in place. This means has been more fully described and claimed in my application filed December 26, 1913, Serial No. 808,660, and which is a division of the present application.

Having thus described my invention, what I claim as new and desire to secure by Letters Patent, is—

1. A vehicle tire comprising an annular member having a peripherally opening channel of rectangular cross section, said channel being provided with opposite radially extending channels or guiding grooves, members having recesses upon their under sides adapted to enter said peripherally opening channel, lugs upon said members adapted to enter said guiding grooves, helical springs disposed in said peripheral channel the upper ends whereof enter said recess, leaf springs extending longitudinally from said recessed members and curved toward the bottom of said peripheral channel, shoes upon the outer ends of said leaf springs, means for securing said members in position comprising a plurality of annularly disposed rods, the ends whereof are unconnected, a pad for covering said rods, an outer casing adapted to inclose the annular member, the springs, rods and pads, and retaining means for said outer casing.

2. In a vehicle tire, an annular member having a peripherally opening channel of rectangular cross section, said channel being provided with opposite radially extending channels, plate members adapted to enter said peripherally opening channel, lugs upon said plate members adapted to enter said radial channels, leaf springs extending longitudinally from said members and curved toward the bottom of said peripheral channel, shoes upon the outer portions of said leaf springs, means for securing said members in position comprising a plurality of annularly disposed rods, the ends whereof are unconnected, a pad for covering said rods, an outer casing adapted to inclose said aforementioned members and means for securing said outer casing in position.

3. In a vehicle tire, a circumferentially disposed member comprising a peripherally opening channel, said member being provided with substantially opposite radially extending guideways, plate members adapted to enter said channel and to be radially guided thereby by means of said guideways, resilient members disposed intermediate said plates and the bottom of said channel, means for securing said plates and resilient members in position comprising a plurality of circumferentially disposed rods the ends whereof are unconnected, a pad for covering said rods, an outer casing adapted to inclose said aforementioned members, and means for securing said outer casing in position.

In testimony whereof, I have hereunto set my hand in the presence of two witnesses.

CHARLES F. FORSTER.

Witnesses:
BENJ. T. ROODHOUSE,
G. W. HILTABRAND.